Patented Mar. 9, 1937

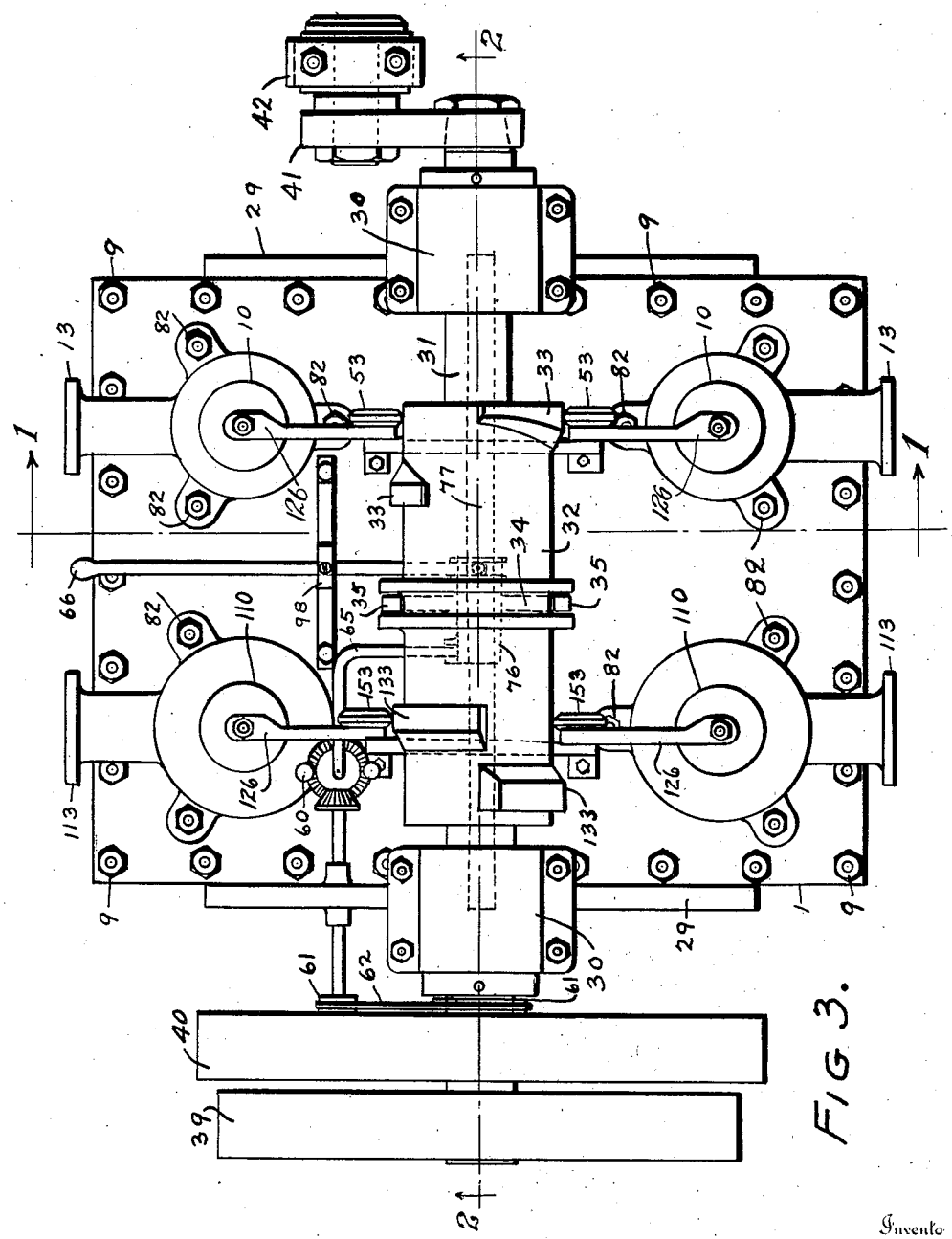

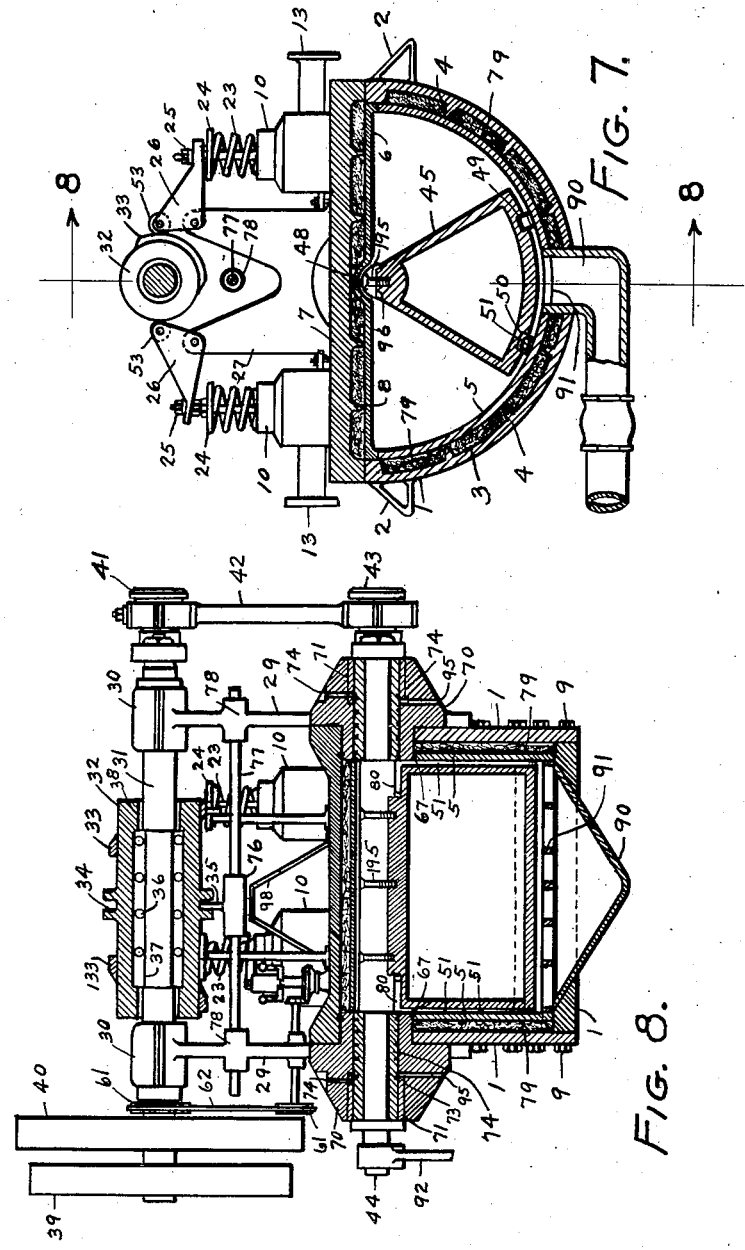

2,073,385

UNITED STATES PATENT OFFICE 2,073,385

OSCILLATING POPPET VALVE ENGINE

Robert H. Blocker, San Francisco, Calif.

Application September 24, 1935, Serial No. 41,942

6 Claims. (Cl. 121—97)

This invention refers to engines driven by gaseous mediums and more particularly to those of an oscillating type or design. It has among its objects to provide an engine that will provide uniform-sized surfaces for the pressure medium to act and operate upon; that will be provided with sealing pieces especially adapted to prevent the leakage of the medium and automatically take up wear; to have the engine arranged suitably for poppet valve devices; to have the valve control designed for variable adjustability without throttling action; to have the valve and cylinder portions of the engine designed for easy replacement and inspection, to have the cylinder walls positively protected against any substantial heat leakage; to have unique and easily handled methods for anchoring the sealing pieces in place, and many other objects that will become apparent as the invention is more fully set forth.

The particular features of this invention include poppet valves for the control of the pressure medium used, which in this case will be steam to more specifically explain its action. The engine utilizes a flat piston hinged at one side and swinging thereon radially through half a circle. The hinged side is called the central side, and the opposite side bearing against the cylinder wall is termed the circumferential side. The other two sides are termed end sides. All sides are provided with surface wiping pieces which take up the wear and prevent leakage. The cam mechanism is arranged with a graduated surface that controls the travel of the rollers in such a manner as to provide for a variable control of the steam admitted into the engine cylinder. The shaft on which the flat piston oscillates is provided a unique bearing that also includes an effective bearing arrangement to keep it properly aligned. The whole cylinder of the engine can be replaced or renewed with great facility while not lessening its practical effectiveness. These features as well as others are not anticipated in other engines of this type, and will be further referred to as the parts of the invention and its operation are more fully described.

In the drawings which illustrate an embodiment of this invention:

Figure 3 is a plan view of the engine shown in Figure 1.

Figure 4 is a detail of the combined restrainer used to secure the sealing pieces in place on the flat piston.

Figure 5 is an enlarged detail of the cam surface for the exhaust valve mechanism.

Figure 6 is an enlarged detail of the cam surface for the admission valve mechanism.

Figure 7 is a sectional view of a cylinder embodying a modified form of valve arrangement.

Figure 8 is a section along line 8—8 of Figure 7 and longitudinally through the engine.

Similar reference characters refer to similar parts throughout the drawings.

Figure 1:
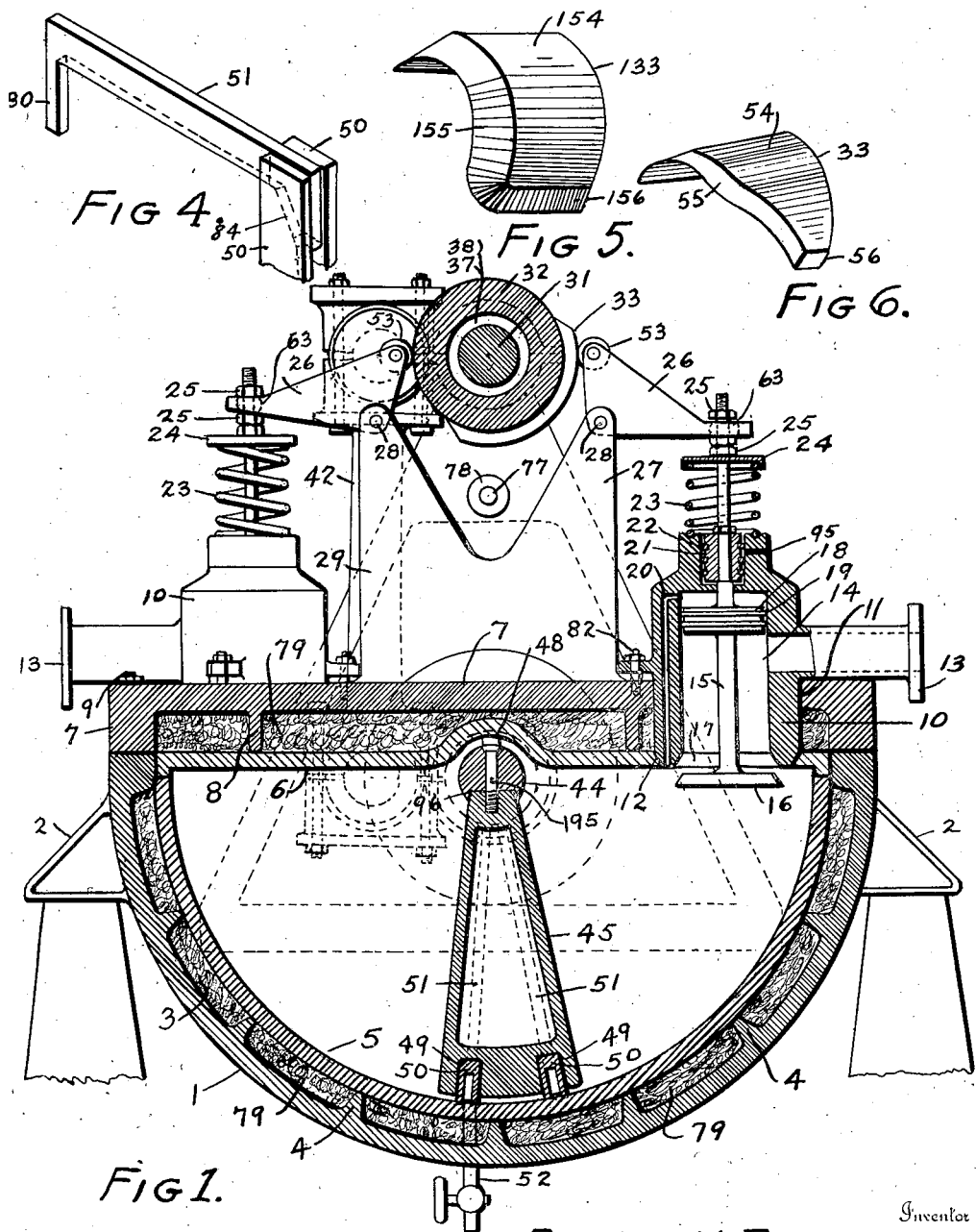
Figure 1 is a sectional view taken on the line 1—1 of Fig. 3 through an oscillating engine embodying this invention.

In the drawings 1 represents the outer casing or body of an oscillating engine and which is mainly of a hemi-cylindrical form and provided with suitable base elements 2 on its exterior to enable it to be properly supported. The interior surface 3 of the body 1 is provided with a suitable number of annular ribs 4 to align and support an inner replaceable piston cylinder member 5. The spaces between the ribs 4 and around the cylinder are filled with a suitable insulation filler 79, like asbestos, to prevent the free and quick dissipation of heat from the cylinder walls 5 to the surrounding air. The cylinder 5 is connected with a replaceable flat cover member 6 preferably constructed as indicated in the drawings and secured in place through the pressure of a surface plate 7 and its spacing ribs 8 thereon. The surface plate is secured by means of stud bolts 9 to the upper portion of the body member 1. The surface plate is arranged to allow the insertion of the admission valve throat 10 through holes 11 in it, to the holes 12 in the cover member 6, and bolts 82 secure same in place to the surface and cover plate as indicated. Provision is also made for the exhaust valve throats in a similar manner. The admission valve has a lead-in pipe 13 that connects with a passage 14 in the throat. This passage has a valve stem 15 with a valve head 16 arranged to control the flow of steam or medium used, through a valve seat 17 provided at the lower end portion of the throat. The middle portion of the stem has a bushed member 18 on which are mounted piston rings 19 of a suitable kind. This portion of the valve stem provides for balancing the valve through the provision of a by-pass passage 20 in the throat member, which leads the steam onto the upper portion of the bushed member as indicated. The stem extends up through and is anchored in a bushing 21, which has piston rings 22 mounted on same to prevent steam leakage. This arrangement puts the wear and tear on the piston rings and prevents wear on the stem 15 and provides for replacement with rings instead of valve stems.

The upper portion of the stem extends above the throat and is kept under the tension of a spring coil 23 held in place with a plate 24 and nuts 25 and is also guided in a flexible joint 63 and these nuts also serve to secure a rocker arm 26 to the stem to operate the same as will be described.

The exhaust valves are similar to the admission valves, and the similar parts are indicated with the same numerical characters with 100 added to same to distinguish same from the admission valve characters. (Thus throat is 110; spring coil 123, etc.).

The rocker arms 26 and 126 are suitably supported by pins 28 on a frame 27 mounted on and secured to the surface plate 7 of the engine. Brackets 29 are mounted on the end plates of the engine and extended above same to support the main bearings 30, which in turn contain the main shaft 31 of the engine. This shaft extends across the engine and has a slidable cylinder 32 for supporting the admission cams 33 and exhaust cams 133, located at either end of the cylinder 32 as shown. A channel 34 formed on this slidable cylinder provides a suitable groove in which an operating finger 35 actuates to move the slidable cylinder 32 longitudinally. The cylinder 32 slides on roller bearings 36 that in turn run in grooves 37 in the shaft 31 and grooves 38 in the cylinder 32.

A fly wheel 39 with a pulley 40 is mounted at one end of the shaft 31, while a crank member 41 with its connecting rod 42 is mounted on the opposite end. This connecting rod attaches to an oscillating crank 43 mounted on an oscillating shaft 44. The oscillating crank 43 is proportioned in relation to the crank 41 in such proportion as to arrange for the complete turn of crank 41 when the crank 43 makes its oscillating movement.

Figure 2:
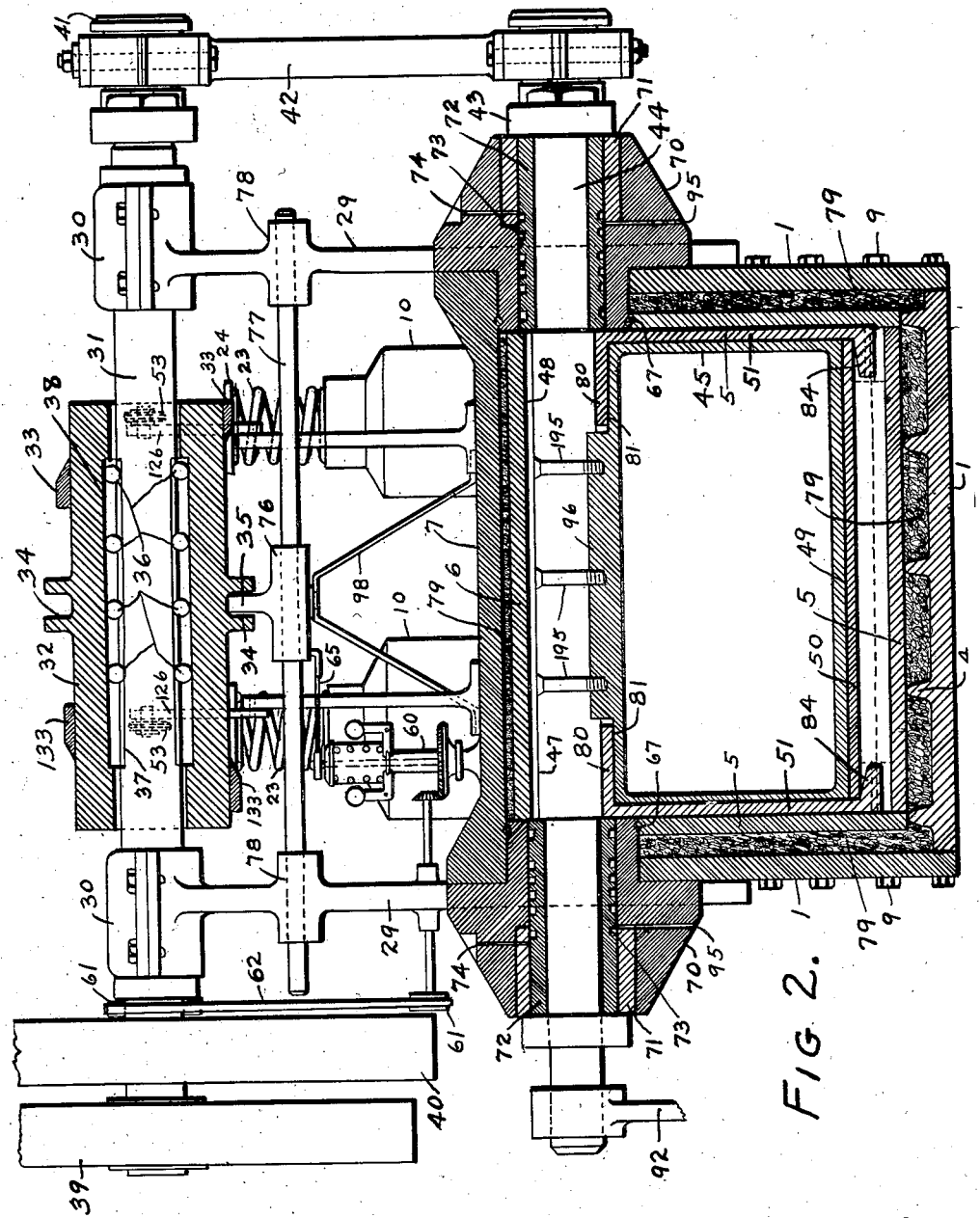
Figure 2 is a sectional view along the line 2—2 of Figure 3 and longitudinally through the engine.

A flat piston member 45 is mounted on the shaft 44 and oscillates in the cylinder 5 and is preferably constructed in a hollow quasi-wedge form as outlined in the section in Figure 1, and is attached to the shaft 44 in slot 96 with screws 195 as shown. The shaft is provided with a slot 47 in which a sealing piece 48 is inserted and held to prevent leakage between the shaft and the top plate 6 of the cylinder. The circumferential and end sides of the flat piston are provided with slots 49 which hold the sealing pieces 50, held in place by the combined restrainer and sealing piece 51 which are preferably as indicated in Figures 2 and 4.

The sealing pieces 50 are readily removable when the combined restrainer and sealing pieces 51 are taken out and permit the same to be replaced. The sealing pieces 50 are formed to cover the exterior periphery and serve to prevent steam leakage. The bottom of the engine is provided with arrangements for a drain cock 52 for draining it.

The rocker arms 26 for the admission valves are provided with beveled rollers 53 that come in contact with their cam members 33. These cam members have their surfaces 54 formed to suit the desired lift and fall of the valve stems 15 and in addition are beveled at the sides 55 and 56 to give the beveled rollers a gradual mounting on the cam. The cam is designed to provide for a greater or more limited travel. This is done by changing the horizontal position of the slidable cylinder 32. The roller first comes in contact with the face of the cam which is parallel to the shaft and leaves the cam on a gradual beveled face so as to give a short or long travel as regulated by sliding cylinder member 32 longitudinally.

The exhaust mechanism is provided with bevel rollers 153, cam members 133, surfaces 154 and beveled sides 155 and 156, which operate as follows: The leading as well as the following face of the exhaust cam is parallel with the shaft. The leading, following, and inside edges are all beveled. This allows gradual contact of the roller.

In the operation of the engine the admission valve on one side of the engine cylinder is opened and steam flows into the cylinder 5, putting pressure on the flat piston and swings the latter through a hemi-circular arc. During this movement the proper cam roller 53 travels on its respective cam 33 over its surface 54 and closes the admission valve on its seat 17 and allows the steam to expand in the cylinder and operate efficiently. When the oscillating piston has reached the end of its stroke, the movement of the slidable cylinder is such as to open the exhaust valve through its cam mechanism and allow the steam to exhaust on that side of the cylinder. At the same time the admission valve on the opposite end of the cylinder opens and forces the flat piston on its return travel. Should the speed of the piston require changing, a governor 60 operated through suitable pulley 61 and drive belt 62 will so move a shifting mechanism 65 with its holder 76 and finger 35 on the shifting rod 77 as to move the slidable cylinder 32. This in turn brings the surfaces, 54, 154, 55, 155, 56 or 156 into registry as the case may be and vary the action of the valves according to the speed or power required of the engine. If it is desired to operate the slidable cylinder 32 manually this may be done through the operation of a suitable hand mechanism 66 mounted on support 98 as shown in the drawings. Suitable gasket members 67 are provided about the engine parts to keep its joints properly packed and leak proof.

The preferred construction of the bearings for supporting the oscillating shaft 44 consist of a bushing 71 pressed in the end of the gland casing 70, mounted in the body 1. This bearing supports the sleeve 72 which is pressed on securely to the shaft 44, and has piston rings 73 around same to prevent leakage from the steam cylinder. Oil holes 74 are provided for lubrication and a drain 95 in the casing as indicated. The shifting rod 77 is mounted in connections 78 in the brackets 29; being arranged to permit the holder 76 to slide on it.

The manner of positioning the combined restrainer and sealing pieces 51 may be understood by referring to Figures 2 and 4. This device consists of a U-shaped member with inwardly bent toes 80 which are inserted into slots 81 in the flat piston near its central portion. The outer toes 84 are slanted so as to support the sealing piece 50, preventing excessive wear on lower portion of cylinder. The manner of accomplishing this is as follows: The point of least wear is nearest to the oscillating shaft. Therefore the combined restraining and sealing piece cannot move end ways anymore than is allowed by the wear at this point. The lower piece cannot go down until the end piece moves outward allowing the lower piece to slide down the bevel shown, therefore limiting all wear to amount of wear at point of least friction.

The combined restrainer and sealing pieces are locked in place when the piston is positioned in the cylinder. These combined restrainers and sealing pieces also serve to provide a sealing arrangement for the end sides of the flat piston. It should be noted that the steam is admitted directly from the poppet valves into the cylinder and does not require any valve chamber or subsidiary port requirements. The engine uses a sliding cam shaft and can provide for considerable field of adjustment in cut-off, throttling, reversing, etc.

The throttling action of the valves is produced in general by limiting the throw of the cam arms 26 and 126. The maximum thickness or height of the cams 33 and 133 gives the arms 26 and 126 their greatest arc movement, and incidently the greatest opening or lift of the valve heads 16. If the shift lever is moved over sufficiently, it will bring the rollers 53 into surface contact with the bevelled surfaces 55 and 155. While thus located, the cam throw will be less than it was previously, and in turn will limit the opening or lift of the valves, or in other words, throttle the steam coming in through the inlet and that going out of the exhaust. The variation of the amount of cam throw depends on the position of the contact with the inclined surfaces 55 and 155 of the rollers 33. The closer to the upper surfaces 54 and 154 the rollers are, the greater the throw; and the further away and down the incline or bevel 55 and 155, the less the cam throw and greater the throttling action. The bevel surfaces 55 and 155 can be theoretically considered to have an unlimited number of steps for the rollers to run in contact with, and thus provide a very fine adjustment or control of the cam throw action.

In Figure 7 the cylinder is provided with an inlet 90 and spacers 91 at the middle position of the travel of the piston, to provide for a uniflow action to the engine. The spacers 91 form a grille or grating across the exhaust passage.

It should be noted that by lengthening the shaft 44 on the off crank side, power of an oscillating character, such as required under various working conditions, may be supplied, through some suitable attachment 92.

While but two forms of this invention are shown in the drawings, it is not desired to limit this application for patent to these particular forms, or in any other way, otherwise than limited by the prior art, as it is appreciated that other forms of construction might be used that would employ the same principles and come within the scope of the appended claims.

What is claimed is:—

1. An oscillating engine comprising in combination, a cylinder, an oscillating piston in the cylinder and operating in an arcuate travel therein, said piston having a plurality of spaced piston walls to be impressed by the pressure medium, sealing members on the periphery of the piston, restrainers secured to the sides of the piston for securing the said members in the piston, poppet valves directly opening into the cylinder, and cam mechanism for controlling the poppet valves and their admission and exhausting of the pressure medium therethrough into and out of the cylinder, a shaft for the piston and arcuately operated thereby, and an oscillating crank operated by the said piston, means actuated by the crank for actuating the cam mechanism from the said shaft, and said restrainers also serving as sealing members for the peripheral sides of the piston.

2. An oscillating engine comprising in combination, a cylinder, an oscillating piston in the cylinder and operating in an arcuate travel therein, said piston having a plurality of spaced piston walls to be impressed by the pressure medium, sealing members on the periphery of the piston, restrainers secured to the sides of the piston for securing the said members in the piston and for sealing the ends of the piston, poppet valves directly opening into the cylinder, and cam mechanism for controlling the poppet valves and their admission and exhausting of the pressure medium therethrough into and out of the cylinder, a shaft for the piston and arcuately operated thereby, and an oscillating crank operated by the said piston, means associated with the crank for actuating the cam mechanism from the said shaft, and an encompassing body about and spaced from the cylinder with insulation means between the body and the cylinder.

3. An engine of the class described comprising in combination, a body having supporting means therefor, a cylinder in the body and spaced internally therefrom, a shaft passing longitudinally through the cylinder and bearingly mounted thereon, a hollow piston mounted on the said shaft and adapted to radially swing therewith the shaft at its central portion, poppet valves mounted on and directly connected with the cylinder for admitting and exhausting the pressure medium therefor, sealing means on the piston, an auxiliary shaft, means for supporting the auxiliary shaft, crank members and connecting rods for the shafts and adapted to operatably connect the same, cam mechanism for operating the valves, means for adjustably controlling the cam mechanism, means for operating the cam mechanism from the piston shaft, and means for controlling the movement of the auxiliary shaft.

4. An engine of the class described comprising in combination, a body having supporting means therefor, a hemi-cylinder attached to the body interiorly and having annular insulation spaces therebetween, a plurality of valves mounted on the body and projecting into the cylinder directly having stems provided with a balancing piston and with piston rings arranged to engage with the walls about the stems, spring coils for the operation of the valves, an oscillating shaft longitudinally arranged in the cylinder and provided with a motive crank extending therefrom, a piston of hollow wedgelike form mounted on the shaft and operating radially thereon and through an arcuate travel, framework attached to the body, a shaft mounted in the frame work and adapted to rotate therein, and having a crank mounted thereon, connecting means between the crank means aforesaid and proportioned in relation to each other for rotating with the last mentioned shaft from the oscillation of the first, a shifting holder, a shaft for supporting the holder, a cam mechanism mounted on said body and actuated by the rotative shaft, a slidable cylinder reciprocated by the holder and operating the said cam mechanism adjustably, means for operating the valves from the said mechanism, and means for gasketing the valves, shafts, and portions of the engine and body.

5. An engine of the class described comprising in combination, a body having supporting means therefor, a hemi-cylinder attached to the body interiorly and having annular insulation spaces therebetween, a plurality of valves mounted on the body and projecting into the cylinder directly having stems provided with balancing piston and with piston rings arranged to engage with the walls about the stems, spring coils for the operation of the valves, an oscillating shaft longitudinally arranged in the cylinder and provided with a motive crank extending therefrom, a piston of hollow wedgelike form mounted on the shaft and operating radially thereon and through an arcuate travel, framework attached to the body, a shaft mounted in the framework and adapted to rotate therein, and having a crank mounted thereon, connecting means between the crank means aforesaid and proportioned in relation to each other for rotating with the last mentioned shaft from the oscillation of the first, a shifting holder, a shaft for supporting the holder, a cam mechanism mounted on said body and actuated by the rotative shaft, a slidable cylinder reciprocated by the holder and operating the said cam mechanism adjustably, means for operating the valves from the said mechanism, means for gasketing the valves, shafts and portions of the engine and body, and means for controlling the uniform operation of the engine and its valve operation.

6. An engine of the class described comprising in combination, a body having supporting means therefor, a hemi-cylinder attached to the body interiorly and having annular insulation spaces therebetween, a plurality of valves mounted on the body and projecting into the cylinder directly having stems provided with balancing piston and with piston rings arranged to engage with the walls about the stems, spring coils for the operation of the valves, an oscillating shaft longitudinally arranged in the cylinder and provided with a motive crank extending therefrom, a piston of hollow wedgelike form mounted on the shaft and operating radially thereon and through an arcuate travel, framework attached to the body, a shaft attached to the framework and adapted to rotate therein, and having a crank mounted thereon, connecting means between the crank means aforesaid and proportioned in relation to each other for rotating with the last mentioned shaft from the oscillation of the first, a shifting holder, a shaft for supporting the holder, a cam mechanism actuated by the rotative shaft, a slidable cylinder reciprocated by the holder and operating the said cam mechanism, means for operating the valves from the said mechanism, means for gasketing the valves, shafts and portions of the engine and body, means for controlling the uniform operation of the engine and its valve operation, and means on the off crank side of the piston shaft for providing power having an oscillating movement.

ROBERT H. BLOCKER.